(12) United States Patent
Nakamura et al.

(10) Patent No.: US 7,682,752 B2
(45) Date of Patent: Mar. 23, 2010

(54) BATTERY

(75) Inventors: Tomoyuki Nakamura, Tokyo (JP); Takahiro Endo, Tokyo (JP); Hiroyuki Akashi, Tokyo (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 11/470,686

(22) Filed: Sep. 7, 2006

(65) Prior Publication Data

US 2007/0059605 A1 Mar. 15, 2007

(30) Foreign Application Priority Data

Sep. 9, 2005 (JP) ............................ P2005-262494
May 30, 2006 (JP) ............................. 2006-149242

(51) Int. Cl.
*H01M 6/18* (2006.01)

(52) U.S. Cl. ...................... 429/306; 429/303; 429/129; 429/246; 429/247

(58) Field of Classification Search ................. 429/129, 429/303, 306, 246, 247
See application file for complete search history.

(56) References Cited

U.S. PATENT DOCUMENTS

2004/0170898 A1* 9/2004 Shibuya et al. .............. 429/303
2004/0185330 A1* 9/2004 Yamaguchi et al. .......... 429/246
2005/0019666 A1* 1/2005 Yasuda ....................... 429/309

FOREIGN PATENT DOCUMENTS

| JP | 06-150900 | 5/1994 |
|---|---|---|
| JP | 10-177865 | 6/1998 |
| JP | 2000-077091 | 3/2000 |
| JP | 2002-050404 | 2/2002 |
| JP | 2000-067907 | 3/2002 |
| JP | 2002-324571 | 8/2002 |
| JP | 2003-086233 | 3/2003 |
| JP | 2003-217673 | 7/2003 |
| JP | 2003-217674 | 7/2003 |
| JP | 2004-327362 | 11/2004 |
| WO | 99-31749 | 6/1999 |

OTHER PUBLICATIONS

Office Action issued on Jun. 24, 2008 in corresponding Japanese Application JP 2006-149242.

* cited by examiner

*Primary Examiner*—Laura S Weiner
(74) *Attorney, Agent, or Firm*—Sonnenschein Nath & Rosenthal LLP (57) ABSTRACT

A battery in which the relative positions of a cathode, an anode and a separator are maintained with high precision is provided. A cathode and an anode face each other with a polymer electrolyte including a polymer and a separator in between. In each of the cathode and the anode, an active material layer is disposed on a current collector. Exposed regions where the active material layers are not disposed on the current collectors and the separator are adhered to each other with the polymer electrolyte in between. Thereby, even under a high-temperature environment, the heat shrinkage of the separator can be prevented, and heat generation due to the generation of a short-circuit current can be prevented.

6 Claims, 8 Drawing Sheets

BATTERY

CROSS REFERENCES TO RELATED APPLICATIONS

The present invention contains subject matter related to Japanese Patent Application JP 2005-262494 filed in the Japanese Patent Office on Sep. 9, 2005, and Japanese Patent Application JP 2006-149242 filed in the Japanese Patent Office on May 30, 2006, the entire contents of which being incorporated herein by references.

BACKGROUND OF THE INVENTION

1. Field of the Invention

The present invention relates to a battery using a polymer electrolyte including a polymer.

2. Description of the Related Art

In recent years, a large number of portable electronic devices such as camcorders, cellular phones and portable computers have emerged, and an attempt to reduce the size and the weight of them has been made. Accordingly, the development of batteries as portable power sources of the electronic devices, specifically secondary batteries have been actively promoted. Among the batteries, a lithium-ion secondary battery receives attention as a battery capable of obtaining a high energy density.

In such a lithium-ion secondary battery, a battery can made of metal such as aluminum (Al) or iron (Fe) is used as a package member. Recently, instead of the battery can made of metal, a laminate film is used as a package member so that the size, the weight and the profile of the battery are further reduced (for example, refer to Japanese Unexamined Patent Application Publication Nos. 2003-217674 and H6-150900).

SUMMARY OF THE INVENTION

However, a laminate film has lower stiffness than a package member made of metal such as aluminum or iron, so the laminate film has a small force to hold down a battery element in a battery. The battery element is a laminate including a cathode and an anode with a separator in between. Therefore, in a battery in which the package member is a laminate film, the application of external forces may cause relative displacement between the cathode, the anode and the separator in the battery element, thereby the cathode and the anode may be short-circuited. When the area of the separator is sufficiently larger than the area of an electrode, even if the relative displacement occurs, contact between the cathode and the anode can be prevented; however, in this case, an extra separator is included, so the amount of an active material which can be filled in the battery is reduced, thereby an energy density is reduced.

In view of the foregoing, it is desirable to provide a battery in which the relative positions of a cathode, an anode and a separator are maintained with high precision.

According to an embodiment of the invention, there is provided a battery including: a cathode and an anode in a film-shaped package member, the cathode and the anode facing each other with a polymer electrolyte and a separator in between, the polymer electrolyte including a polymer, wherein an active material layer is disposed on a current collector in at least one of the cathode and the anode, and an exposed region where the active material layer is not disposed on the current collector and the separator are at least partially adhered to each other with the polymer electrolyte in between.

In the battery according to the embodiment of the invention, a part of the separator is adhered to the exposed region of a current collector in at least one of the cathode and the anode by the polymer electrolyte, so the relative positions of the separator and at least one of the cathode and the anode are fixed.

In the battery according to the embodiment of the invention, the exposed region of the current collector and the separator are adhered to each other with the polymer electrolyte including the polymer in between, so the relative positions of the cathode, the anode and the separator can be maintained with high precision. Therefore, the contact between the cathode and the anode can be prevented, and heat generation due to the generation of a short-circuit current can be prevented.

In particular, when the peel strength when the exposed region and the separator are peeled from each other is 5 mN/mm or over, adhesion becomes higher, so a higher effect can be obtained.

Moreover, when the polymer includes a polymer including vinylidene fluoride as a component, a higher effect can be obtained.

Further, when the thickness of the polymer electrolyte is 1 µm or over, a higher effect can be obtained.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
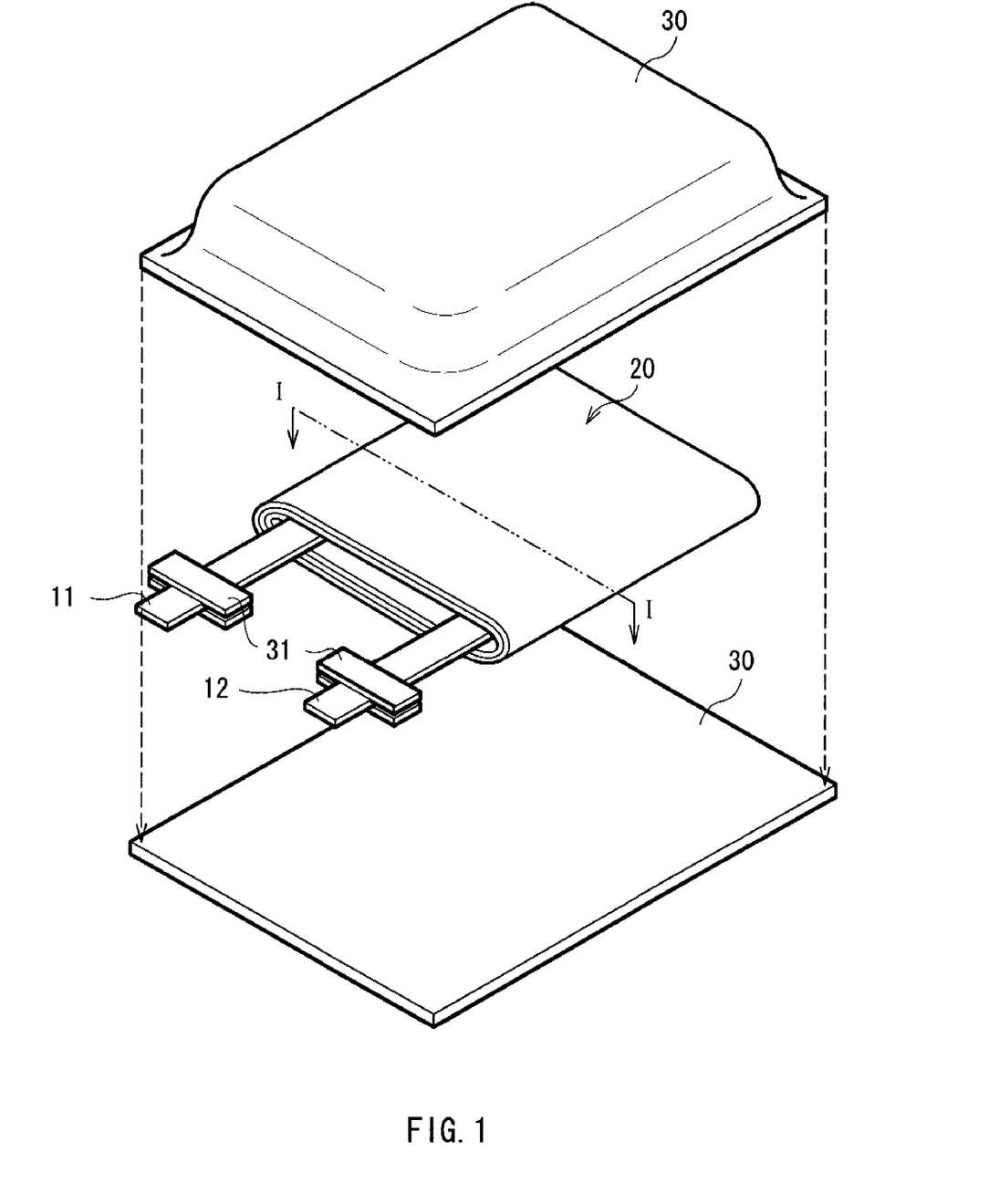
FIG. 1 is an exploded perspective view of the structure of a secondary battery according to a first embodiment of the invention.

FIG. 1 shows the structure of a secondary battery 1 according to a first embodiment of the invention. The secondary battery 1 is specifically a winding type of so-called laminate film types, and in the secondary battery 1, a winding type battery element 20 to which a cathode terminal 11 and an anode terminal 12 are attached is contained in film-shaped package members 30.

The cathode terminal 11 and the anode terminal 12 are drawn from the interiors of the package members 30 to outside, for example, in the same direction. The cathode terminal 11 and the anode terminal 12 are made of, for example, a metal material such as aluminum, copper (Cu), nickel (Ni) or stainless in a sheet shape or a mesh shape.

The package members 30 are made of, for example, a rectangular aluminum laminate film including a nylon film, aluminum foil and a polyethylene film which are bonded in this order. The package members 30 are disposed so that the polyethylene film of each of the package members 30 faces the battery element 20, and edge portions of the package members 30 are adhered to each other by fusion bonding or an adhesive. An adhesive film 31 is inserted between the package members 30 and the cathode terminal 11 and the anode terminal 12 for preventing the entry of outside air. The adhesive film 31 is made of, for example, a material having adhesion to the cathode terminal 11 and the anode terminal 12, for example, a polyolefin resin such as polyethylene, polypropylene, modified polyethylene or modified polypropylene.

In addition, the package members 30 may be made of a laminate film with any other structure, a high molecular weight film such as polypropylene or a metal film instead of the above-described aluminum laminate film.

Figure 2:
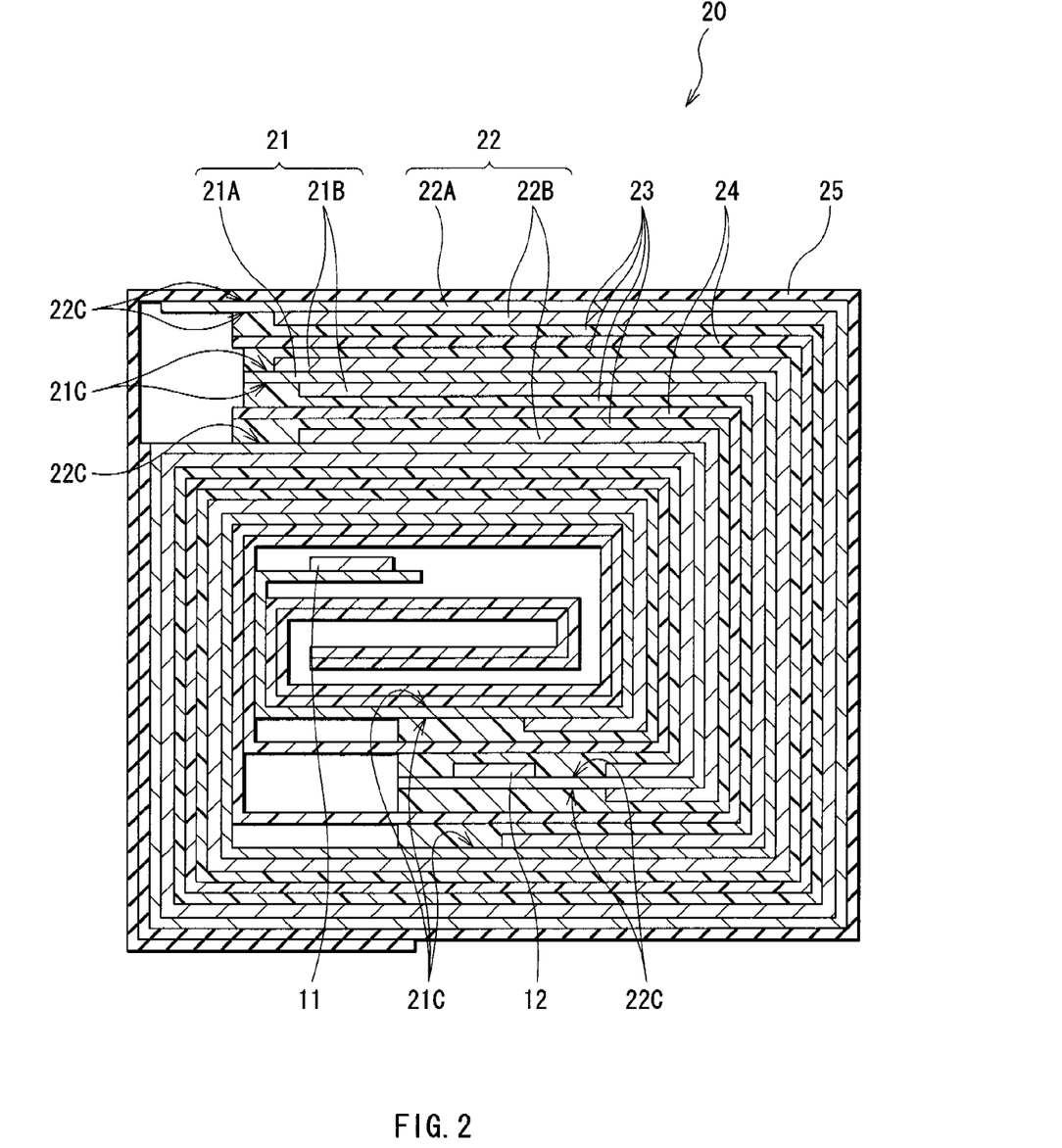
FIG. 2 is a sectional view of a battery element taken along a line I-I of FIG. 1.

FIG. 2 shows a sectional view of the battery element 20 taken along a line I-I of FIG. 1. The battery element 20 is a spirally wound element in which a cathode 21 and an anode 22 face each other with a polymer electrolyte 23 and a separator 24 in between, and an outermost portion of the battery element 20 is protected with a protective tape 25.

The cathode 21 has a structure in which an active material layer 21B is disposed on one side or both sides of a current collector 21A having a pair of facing surfaces. The current collector 21A has an exposed region 21C where the active material layer 21B is not disposed in an end portion in a longitudinal direction. The cathode terminal 11 is attached to the exposed region 21C. The current collector 21A is made of, for example, metal foil such as aluminum foil, nickel foil or stainless foil.

The active material layer 21B includes, for example, one kind or two or more kinds of cathode materials capable of inserting and extracting lithium (Li) which is an electrode reactant as cathode active materials, and the active material layer 21B includes an electrical conductor and a binder if necessary.

As the cathode material capable of inserting and extracting lithium, for example, a chalcogenide not including lithium such as titanium sulfide ($TiS_2$), molybdenum sulfide ($MoS_2$), niobium selenide ($NbSe_2$) or vanadium oxide ($V_2O_5$), or a lithium-containing compound, or a polymer such as polyacetylene or polypyrrole is used.

Among them, the lithium-containing compound is preferable, because the lithium-containing compound can obtain high voltage and a high energy density. As such a lithium-containing compound, for example, a complex oxide including lithium and a transition metal element, or a phosphate compound including lithium and a transition metal element is cited, and in particular, a lithium-containing compound including at least one kind selected from the group consisting of cobalt (Co), nickel, manganese (Mn) and iron is preferable, because higher voltage can be obtained. The chemical formula of the lithium-containing compound is represented by, for example, $Li_xMIO_2$ or $Li_yMIIPO_4$. In the formulas, MI and MII represent one or more kinds of transition metal elements. In the formulas, the values of x and y depend upon a charge-discharge state of the battery, and are generally within a range of $0.05 \leq x \leq 1.10$ and $0.05 \leq y \leq 1.10$, respectively.

Specific examples of the complex oxide including lithium and a transition metal element include lithium-cobalt complex oxide ($Li_xCoO_2$), lithium-nickel complex oxide ($Li_xNiO_2$), lithium-nickel-cobalt complex oxide ($Li_xNi_zCo_{1-z}O_2$ ($0<z<1$)), lithium-manganese complex oxide ($LiMn_2O_4$) having a spinel structure and the like. Specific examples of the phosphate compound including lithium and a transition metal element include lithium-iron phosphate compound ($LiFePO_4$) and a lithium-iron-manganese phosphate compound ($LiFe_{1-v}Mn_vPO_4$ ($V<1$)).

As in the case of the cathode 21, the anode 22 has a structure in which an active material layer 22B is disposed on one side or both sides of a current collector 22A having a pair of facing surfaces. The current collector 22A has an exposed region 22C where the active material layer 22B is not disposed in an end portion in a longitudinal direction, and the anode terminal 12 is attached to the exposed region 22C. The current collector 22A is made of, for example, metal foil such as copper foil, nickel foil or stainless foil.

The active material layer 22B includes, for example, one kind or two or more kinds of anode materials capable of inserting and extracting lithium which is an electrode reactant as anode active materials, and the active material layer 22B includes an electrical conductor and a binder if necessary.

As the anode material capable of inserting and extracting lithium, for example, carbon materials, metal oxides and polymers are cited. As the carbon materials, non-graphitizable carbon materials, graphite materials and the like are cited, and more specifically, kinds of pyrolytic carbon, kinds of coke, kinds of graphite, kinds of glass-like carbon, fired high molecular weight organic compound bodies, carbon fibers, activated carbon and the like are used. Among them, kinds of coke include pitch coke, needle coke, petroleum coke and so on, and the fired high molecular weight organic compound bodies are polymers such as a phenolic resin and a furan resin which are carbonized by firing at an adequate temperature. Moreover, the metal oxides include iron oxide, ruthenium oxide, molybdenum oxide and so on, and the polymers include polyacetylene, polypyrrole and the like.

As the anode material capable of inserting and extracting lithium, a material including at least one kind selected from the group consisting of metal elements and metalloid elements capable of forming an alloy with lithium. The anode material may be a simple substance, an alloy or a compound of a metal element or a metalloid element, or a material including at least a part of a phase including one kind or two or more kinds of them. In the present invention, the alloy means an alloy including two or more kinds of metal elements as well as an alloy including one or more kinds of metal elements and one or more kinds of metalloid elements. Moreover, the alloy may include a non-metal element. As the texture of the alloy, a solid solution, a eutectic (eutectic mixture), an intermetallic compound or the coexistence of two or more kinds selected from them is cited.

Such metal elements and metalloid elements include, for example, tin (Sn), lead (Pb), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y). Among them, a Group 14 metal element or a Group 14 metalloid element in the long form of the periodic table of the elements is preferable, and in particular, silicon or tin is preferable, because silicon and tin have a high capability to insert and extract lithium, and can obtain a high energy density.

As a tin alloy, for example, a tin alloy including at least one kind selected from the group consisting of silicon, nickel, copper, iron, cobalt, manganese, zinc, indium, silver, titanium (Ti), germanium, bismuth, antimony and chromium (Cr) as a second element in addition to tin is cited. As a silicon alloy, for example, a silicon alloy including at least one kind selected from the group consisting of tin, nickel, copper, iron, cobalt, manganese, zinc, indium, silver, titanium, germanium, bismuth, antimony and chromium as a second element in addition to silicon is cited.

As a compound of tin or silicon, for example, a compound including oxygen (O) or carbon (C) is cited, and in addition to tin or silicon, the compound may include the above-described second element.

The polymer electrolyte 23 includes an electrolyte solution and a polymer holding the electrolyte solution, and is a so-called gel electrolyte. The electrolyte solution includes, for example, a solvent and an electrolyte salt dissolved in the solvent. The polymer electrolyte 23 may not hold all of the electrolyte solution. For example, the cathode 21, the anode 22 or the separator 24 may be impregnated with some of the electrolyte solution.

Examples of the solvent include a lactone-based solvent such as γ-butyrolactone, γ-valerolactone, δ-valerolactone or ε-caprolactone, a carbonate-based solvent such as ethylene carbonate, propylene carbonate, butylene carbonate, dimethyl carbonate, ethyl methyl carbonate or diethyl carbonate, an ether-based solvent such as 1,2-dimethoxyethane, 1-ethoxy-2-methoxyethane, 1,2-diethoxyethane, tetrahydrofuran or 2-methyltetrahydrofuran, a nitrile-based solvent such as acetonitrile, a sulfolane-based solvent, phosphoric acids, a phosphate solvent, and nonaqueous solvents such as pyrrolidones. As the solvent, one kind or a mixture of two or more kinds selected from them may be used.

As the electrolyte salt, any salt which is dissolved in the solvent and generates ions may be used, and one kind or a mixture of two or more kinds selected from salts may be used. Examples of lithium salts include lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($LiCF_3SO_3$), lithium bis(trifluoromethanesulfonyl)imide ($LiN(SO_2CF_3)_2$), lithium tris(trifluoromethanesulfonyl)methyl ($LiC(SO_2CF_3)_3$), lithium tetrachloroaluminate ($LiAlCl_4$), lithium hexafluorosilicate ($LiSiF_6$) and so on. Among them, lithium hexafluorophosphate or lithium tetrafluoroborate is preferable in terms of oxidation stability.

The concentration of the electrolyte salt in the electrolyte solution is preferably within a range from 0.1 mol to 3.0 mol per liter (l) of the solvent, and more preferably within a range from 0.5 mol to 2.0 mol, because in this range, good ion conductivity can be obtained.

As the polymer, for example, a polymer including vinylidene fluoride as a component is cited. More specifically, a copolymer including polyvinylidene fluoride or vinylidene fluoride as a component is cited. Specific examples of the copolymer include a vinylidene fluoride-hexafluoropropylene copolymer, a vinylidene fluoride-tetrafluoroethylene copolymer, a vinylidene fluoride-chlorotrifluoroethylene copolymer, a vinylidene fluoride-hexafluoropropylene-tetrafluoroethylene copolymer, a vinylidene fluoride-hexafluoropropylene-chlorotrifluoroethylene copolymer, or any of the above copolymers copolymerized with another ethylenically unsaturated monomer.

As the polymer, polyacrylonitrile, polyethylene oxide, polymethyl methacrylate, polyvinyl chloride or a derivative thereof is cited. As the polymer, one kind or a mixture of two or more kinds selected from them may be used.

The separator 24 is made of, for example, an insulating thin film having high ion transmittance and a predetermined mechanical strength such as a porous film of a polyolefin-based material such as polypropylene or polyethylene, or a porous film of an inorganic material such as ceramic nonwoven, and the separator 24 may have a structure in which two or more kinds of the porous films are laminated.

The separator 24 is adhered to the active material layers 21B and 22B with the polymer electrolyte 23 in between. Moreover, at least a part of the separator 24 is adhered to the exposed region 21C of the current collector 21A and the exposed region 22C of the current collector 22A with the polymer electrolyte 23 in between. Thereby, even in the case where some external forces are applied from the outside of the package members 31, the relative positions of the cathode 21, the anode 22 and the separator 24 can be maintained. Moreover, even under a high-temperature environment, the heat shrinkage of the separator 24 can be prevented. Therefore, heat generation due to a short-circuit current generated by the contact between the current collector 21A and the current collector 22A can be prevented. In particular, in a region where the cathode 21 and the anode 22 face each other with the separator 24 in between, the whole surfaces of the cathode 21 and the anode 22 are preferably adhered to the separator 24 by the polymer electrolyte 23, because a higher effect can be obtained. Moreover, as the polymer of the polymer electrolyte 23, a copolymer including vinylidene fluoride as a component is preferably used, because a higher effect can be obtained. Further, the thickness of the polymer electrolyte 23 is preferably 1 μm or over, because when the thickness is too small, the adhesion declines.

The peel strength when peeling the exposed regions 21C and 22C and the separator 24 adhered together with the polymer electrolyte 23 in between from each other is preferably 5 mN/mm or over, because the adhesion between them is higher, and the heat generation due to the generation of the short-circuit current can be further prevented. Moreover, the peel strength when peeling the cathode active material layer 21B or the anode active material layer 22B and the separator 24 from each other is preferably within the same range, because an increase in resistance in an interface according to charge and discharge can be prevented.

The secondary battery 1 can be manufactured through the following steps, for example.

At first, the active material layer 21B is formed on the current collector 21A so as to form the cathode 21. The active material layer 21B is formed through the following steps. The powder of the cathode active material, an electrical conductor and a binder are mixed to form a cathode mixture, and then the cathode mixture is dispersed in a solvent such as N-methyl-2-pyrrolidone to form paste-form cathode mixture slurry. The cathode mixture slurry is applied to the current collector 21A, and the cathode mixture slurry is dried, and compression molded, thereby the active material layer 21B is formed. Moreover, as in the case of the cathode 21, the anode 22 is formed through forming the active material layer 22B on the current collector 22A.

Next, the cathode terminal 11 is attached to the exposed region 21C of the current collector 21A, and the anode terminal 12 is attached to the exposed region 22C of the current collector 22A. The cathode 21 and the anode 22 are laminated with the separator 24 in between to form a laminate, and the laminate is spirally wounded in a longitudinal direction, and the protective tape 25 is adhered to an outermost portion of the laminate so as to form a spirally wound electrode body. At this time, a high molecular weight solution formed through dissolving a polymer in a solvent such as N-methyl-2-pyrrolidone is applied to the separator 24, and the high molecular weight solution is dried to remove the solvent, thereby a precursor layer of the polymer electrolyte 23 is formed on the separator 24. The high molecular weight solution may be applied to the cathode 21 or the anode 22 instead of the separator 24. Next, the spirally wound electrode body is sandwiched between the package members 30, and the edge portions of the package members 30 except for one side are adhered by thermal fusion bonding, and the electrolyte solution is injected into the package members 30, and then the edge portions on the remaining side are adhered by thermal fusion bonding to seal the electrolyte solution in the package members 30. After that, if necessary, the electrolyte solution is held by the polymer through applying heat to form the polymer electrolyte 23, thereby the secondary battery 1 shown in FIGS. 1 and 2 is completed. At this time, the adhesive strength between the exposed region 21C or the exposed region 22C and the separator 24 can be controlled by changing heating conditions or the like as appropriate or applying pressure.

When the secondary battery 1 is charged, lithium ions are extracted from the cathode 21, and are inserted into the anode 22 through the electrolyte solution. On the other hand, when the secondary battery 1 is discharged, for example, lithium ions are extracted from the anode 22, and are inserted into the cathode 21 through the electrolyte solution. In this case, the exposed region 21C of the current collector 21A or the exposed region 22C of the current collector 22A and the separator 24 are firmly adhered together with the polymer electrolyte 23 in between, so even in the case where some external forces are applied, it is difficult to displace the relative positions of the cathode 21, the anode 22 and the separator 24, and even under a high-temperature environment, the heat shrinkage of the separator 24 can be prevented.

Thus, in the embodiment, the exposed region 21C of the current collector 21A or the exposed region 22C of the current collector 22A and the separator 24 are adhered together with the polymer electrolyte 23 including the polymer in between, so the influence of external forces or thermal load on the separator 24 can be reduced, and heat generation due to the generation of a short-circuit current can be prevented. At this time, the size of the separator 24 occupying the interior of the battery can be minimized, so it is not necessary to reduce the total amount of the active materials, and there is an advantage to secure a high energy density.

In particular, when the peel strength when peeling the exposed regions 21C and 22C and the separator 24 from each other is 5 mN/mm or over, the adhesion becomes higher, so a higher effect can be obtained.

Moreover, when the polymer includes a polymer including vinylidene fluoride as a component, the adhesion becomes higher, so a higher effect can be obtained.

Further, when the thickness of the polymer electrolyte 23 is 1 μm or over, the adhesion becomes higher, so a higher effect can be obtained.

Second Embodiment

Figure 4:
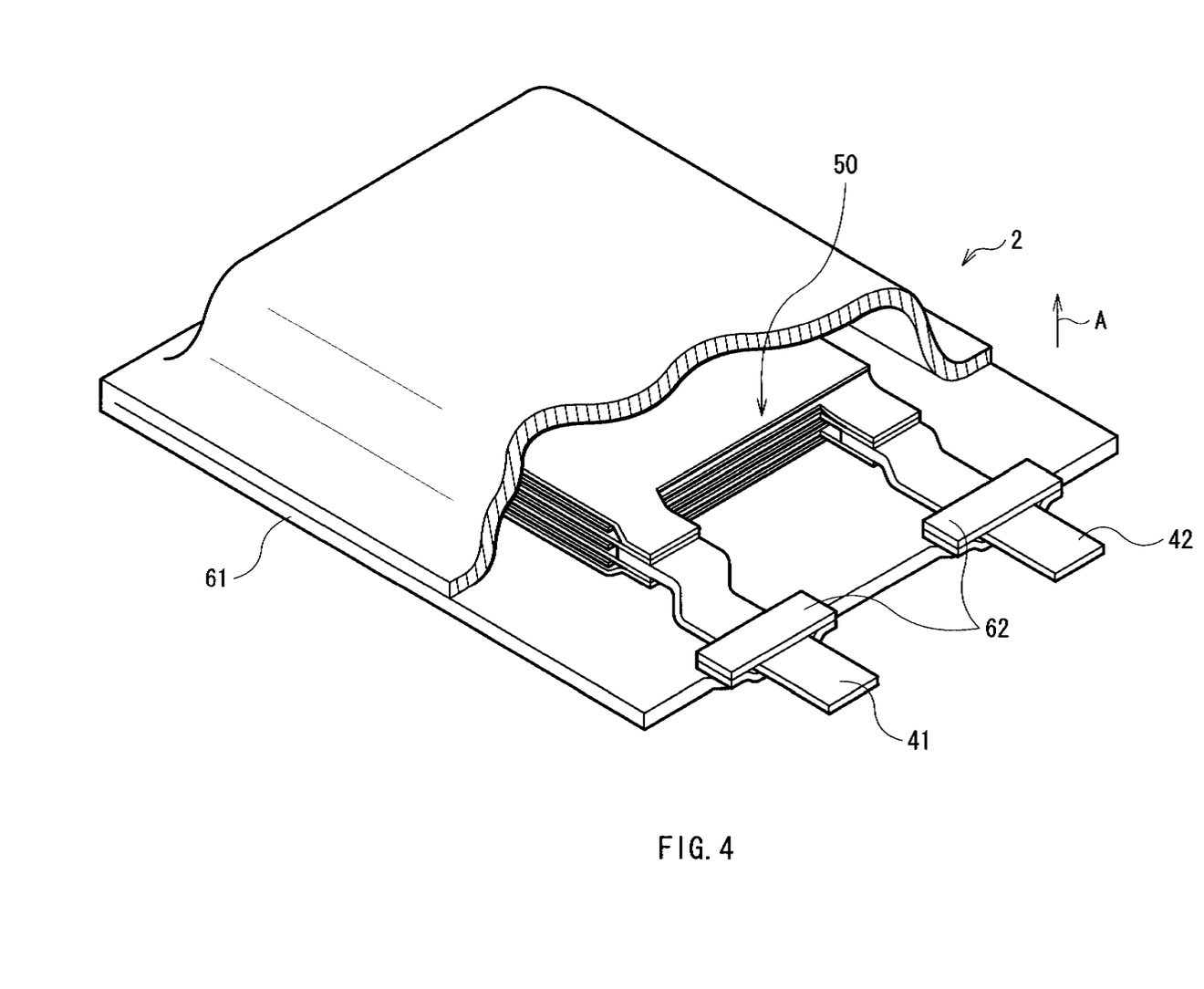
FIG. 4 is an exploded perspective view of the structure of a secondary battery according to a second embodiment of the invention.

FIG. 4 shows the structure of a secondary battery 2 according to a second embodiment of the invention. The secondary battery 2 is specifically a laminate type of so-called laminate film types, and in the secondary battery 2, a laminate type battery element 50 to which a cathode terminal 41 and an anode terminal 42 are attached is contained in a film-shaped package members 61.

The cathode terminal 41 and the anode terminal 42 take out an electromotive force generated in the laminate type battery element 50 to outside, and each have a strap shape. They are drawn from the interiors of the package members 61 to outside, for example, in the same direction. The cathode terminal 41 and the anode terminal 42 have the same structures as the cathode terminal 11 and the anode terminal 12 in the secondary battery 1 shown in FIG. 1, respectively. An adhesive film 61 is inserted between the package members 61 and the cathode terminal 41 and the anode terminal 42 for preventing the entry of outside air. The package members 61 and the adhesive film 62 have the same structures as the package members 30 and the adhesive film 31 in the secondary battery 1, respectively.

Figure 5:
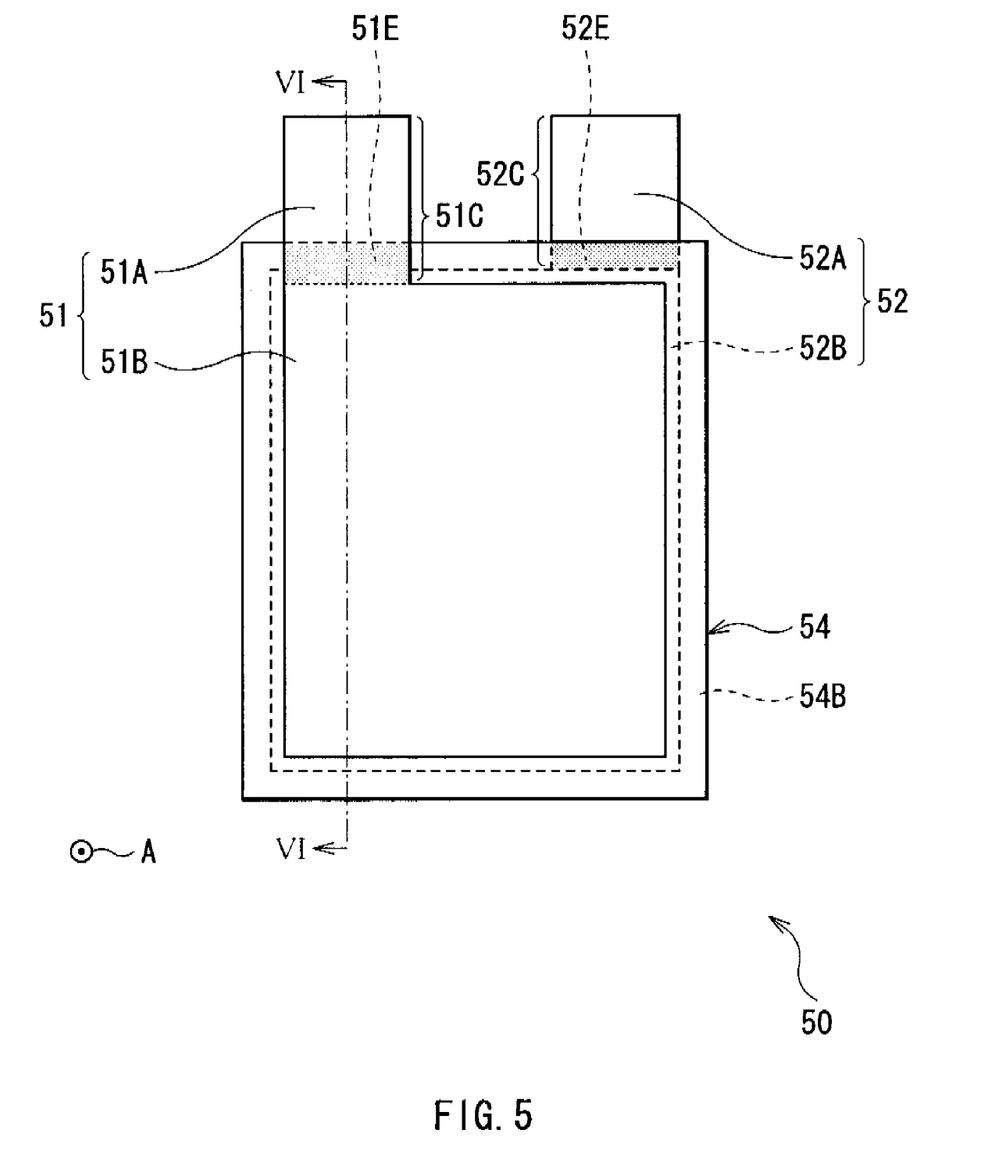
FIG. 5 is a top view of a battery element shown in FIG. 4.
Figure 6:
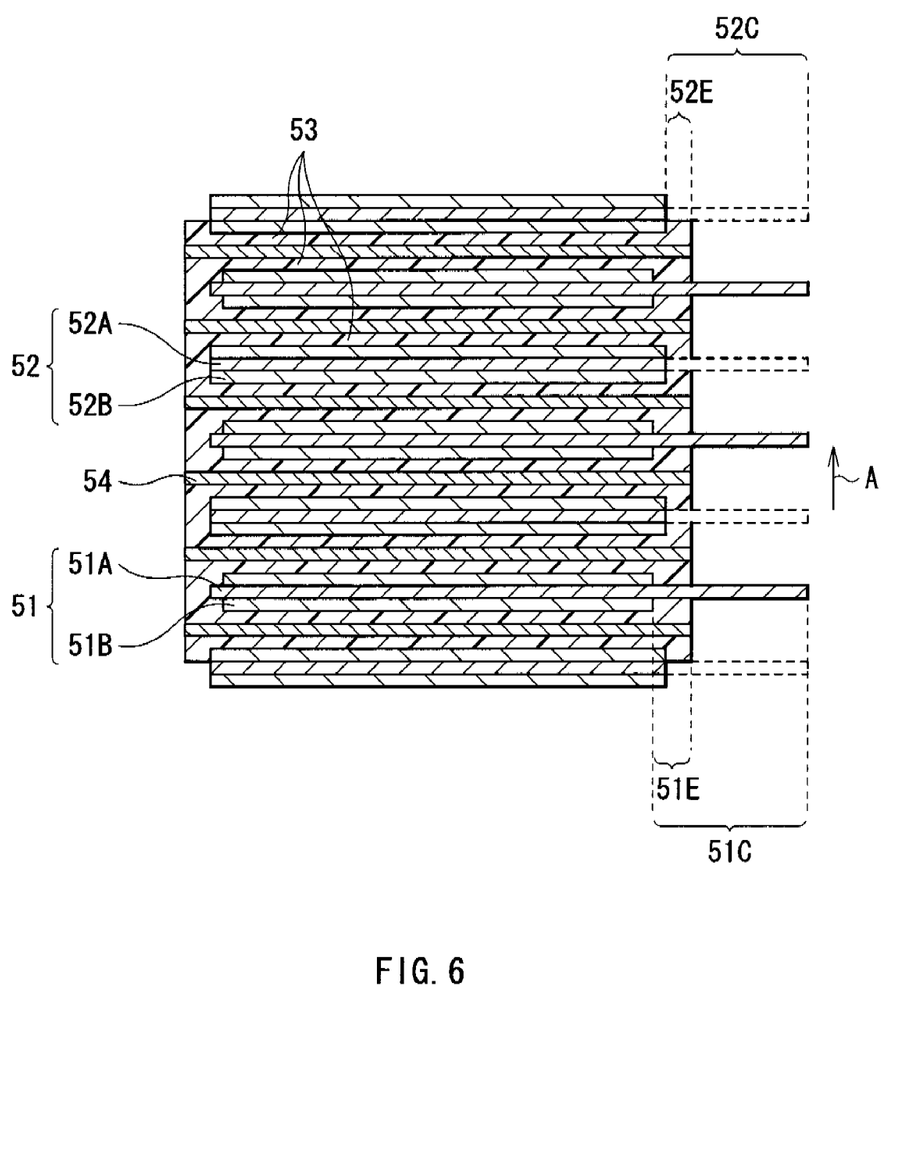
FIG. 6 is a sectional view of the battery element taken along a line VI-VI of FIG. 5.

FIG. 5 shows a top view of the appearance of the battery element 50 shown in FIG. 4 and FIG. 6 shows a sectional view taken along a line VI-VI of FIG. 5. The laminate type battery element 50 is formed through alternately laminating cathodes 51 and anodes 52 with separators 54 in between.

Figure 7:
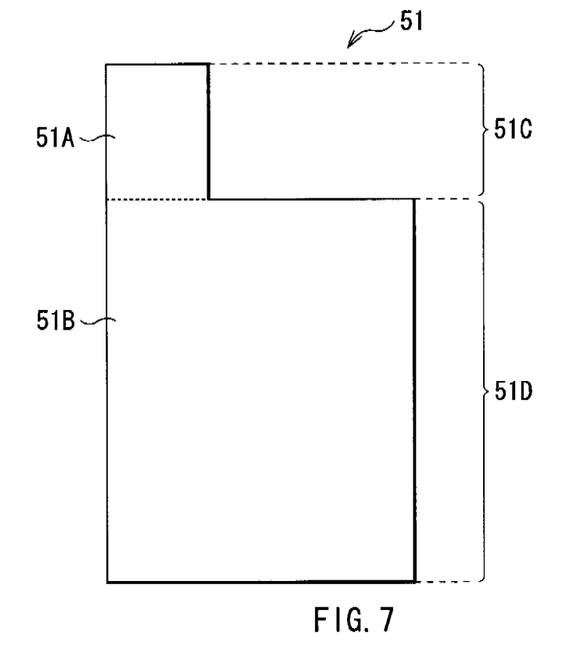
FIG. 7 is a plan view of a cathode included in the battery element shown in FIG. 4.

FIG. 7 shows the structure of one cathode 51 viewed from a laminate direction. The cathode 51 has a rectangular coated region 51D where an active material layer 51B is disposed on both sides of a current collector 51A. An exposed region 51C which will be a strap-shaped terminal attaching portion is projected from one corner of the coated region 51D. In the exposed region 51C, the active material layer 51B is not disposed, and the current collector 51A is exposed, and the cathode terminal 41 (refer to FIG. 4) is bonded to the exposed region 51C. In FIGS. 5 and 6, a state before bonding the cathode terminal 41 is shown.

Figure 8:
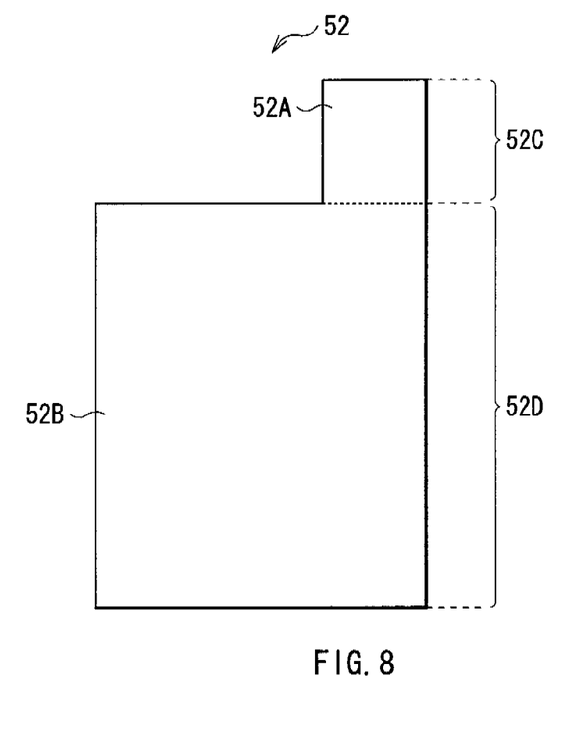
FIG. 8 is a plan view of an anode included in the battery element shown in FIG. 4.

FIG. 8 shows the structure of one anode 52 viewed from a laminate direction. As in the case of the cathode 51, the anode 52 has a structure in which an exposed region 52C which will be a strap-shaped terminal attaching portion is projected from one corner of a rectangular coated region 52D where an active material layer 52B is disposed on both sides of a current collector 52A. In the exposed region 52C, the active material layer 52B is not disposed, and the current collector 52A is exposed, and the anode terminal 42 (refer to FIG. 4) is bonded to the exposed region 52C. In FIGS. 5 and 6, a state before bonding the anode terminal 42 is shown.

As shown in FIGS. 4 and 5, the exposed region 51C and the exposed region 52C are disposed so as not to coincide with each other in a laminate direction A (a direction orthogonal to the paper plane of FIG. 5) of the battery element 50. Moreover, the anode 52 is formed so as to be larger than the cathode 51, and the relative positions of the cathode 51 and the anode 52 are adjusted so that the coated region 51D fits into the inside of the coated region 52D when viewed from the laminate direction A. In the case where the coated region 51D does not fit into the inside of the coated region 52D, a portion which does not face the coated region 51D (a portion protruding from the coated region 51D) is formed in an end portion of the coated region 52D. Therefore, at the time of charging, the area of the anode 52 which is supposed to receive lithium ions extracted from the cathode 51 is not large enough (that is, the current density of the end portion of the anode 52 increases), thereby a metal lithium dendrite may be deposited. The deposition of such a metal lithium dendrite may cause a capacity loss, or an internal short circuit due to damage to the separator 54, so to prevent the deposition of the metal lithium dendrite, the above-described structure is used in the embodiment. The capacity of inserting lithium per unit area of the active material layer 52B is set so as not to exceed the capacity of extracting lithium per unit area of the active material layer 51B.

The separator 54 is adhered to the active material layers 51B and 52B occupying the coated regions 51D and 52D with the polymer electrolyte 53 in between (refer to FIG. 6). The separator 54 is further adhered to the current collectors 51A and 52A in an overlap portion 51E with the exposed region 51C and an overlap portion 52E with the exposed region 52C with the polymer electrolyte 53 in between (refer to FIGS. 5 and 6). In other words, the overlap portions 51E and 52E are adhering regions. Thereby, even in the case where some external forces are applied from the outside of the package members 61, the relative positions of the cathode 51, the anode 52 and the separator 54 can be maintained.

Moreover, the separator 54 has a larger area than the regions where the active material layers 52A and 52B are formed in the cathode 51 and the anode 52, that is, the coated regions 51D and 52D, and edge portions 52B of the separators 54 are adhered together with the polymer electrolyte 53 in between so as to surround the coated regions 51D and 52D. Therefore, the separators 54 form a bag so as to wrap each of the cathodes 51 and the anodes 52. Thereby, even under a high-temperature environment, the heat shrinkage of the separator 54 can be prevented, and the heat generation due to a short-circuit current generated by the contact between the current collector 51A and the current collector 52A can be prevented.

The secondary battery 2 can be manufactured through the following steps, for example.

Figure 9A:
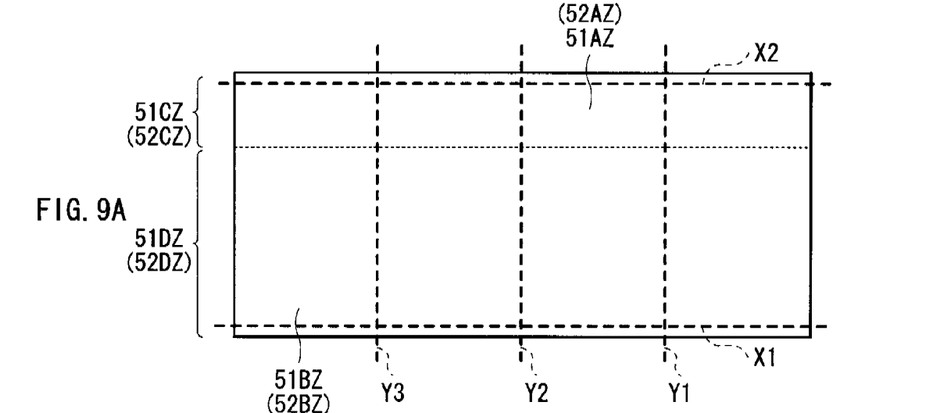
FIGS. 9A, 9B and 9C are illustrations showing steps in a method of manufacturing the secondary battery shown in FIG. 5.

At first, for example, a cathode active material, an electrical conductor and a binder are mixed to form a cathode mixture, and the cathode mixture is dissolved in a solvent such as N-methyl-2-pyrrolidone to form cathode mixture slurry. Next, as shown in FIG. 9A, the cathode mixture slurry is applied to both sides of strip-shaped metal foil 51AZ made of, for example, aluminum foil or the like, and the cathode mixture slurry is dried and compression molded to form an active material film 51BZ. At this time, the active material film 51BZ is formed only on a coated portion 51DZ which will be the coated region 51D in the metal foil 51AZ, and the active material film 51BZ is not formed on an exposed portion 51CZ which will be the exposed region 51C. Moreover, the position where the coated portion 51DZ is substantially the same on the both sides of the metal foil 51AZ.

Next, the metal foil 51AZ on which the active material film 51BZ is formed is cut along broken lines X1 and X2 and broken lines Y1 through Y3 shown in FIG. 9A so as to form four rectangular electrode plates 51Z. The number of the electrode plates 51Z formed at a time is not limited to four, and can be selected as appropriate.

Figure 9B:
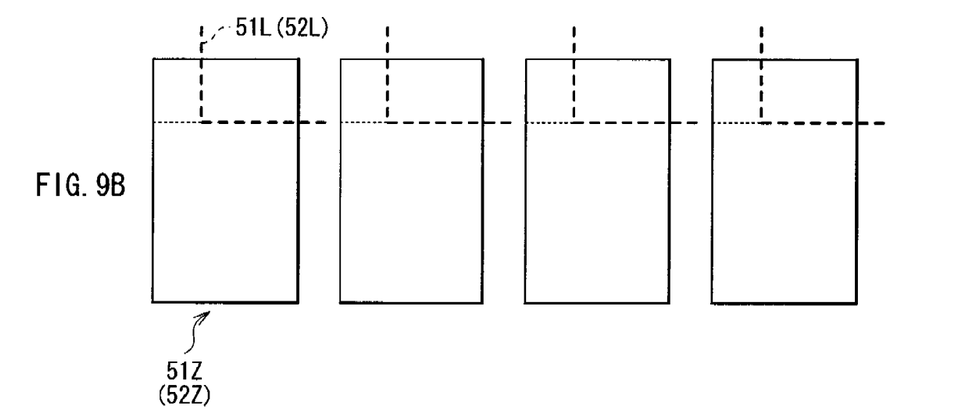
Figure 9C:
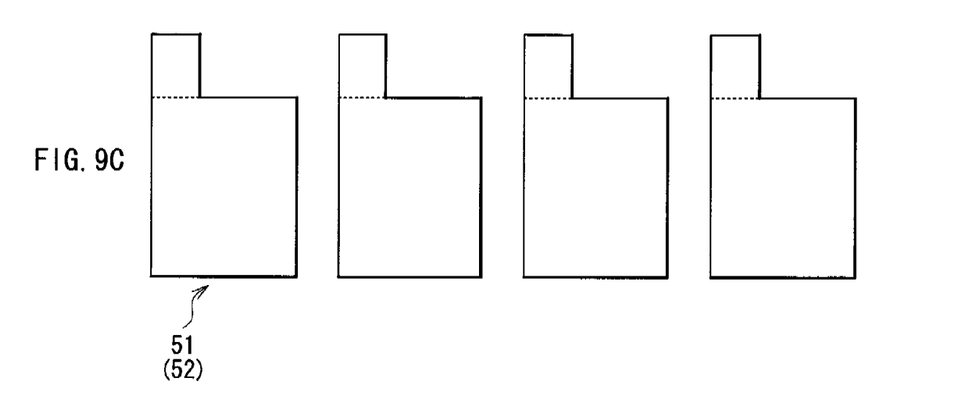

Further, the electrode plates 51Z are cut along a broken line 51L shown in FIG. 9B so as to form four cathodes 51 with a predetermined shape as shown in FIG. 9C.

The anode 52 is formed as in the case of the cathode 21. More specifically, at first, an anode active material and a binder are mixed to form an anode mixture, and the anode mixture is dissolved in a solvent such as N-methyl-2-pyrrolidone to form anode mixture slurry. Then, the anode mixture slurry is applied to both sides of strip-shaped metal foil 52AZ made of copper foil or the like, and the anode mixture slurry is dried and compression molded to form an active material film 52BZ. At this time, as in the case of the cathode 51, the active material film 52BZ is formed only on a coated portion 52BZ which will be the coated region 52D in the metal foil 52AZ, and the active material film 52BZ is not formed on an exposed portion 52CZ which will be the exposed region 52C. Moreover, the position where the coated portion 52DZ is formed is substantially the same on the both sides of the metal foil 52AZ. In other words, a coated end of the coated portion 52DZ is positioned on substantially the same line on both sides.

Next, the metal foil 52AZ on which the active material film 52BZ is formed is cut along broken lines X1 and X2 and broken lines Y1 through Y3 shown in FIG. 9A, and the metal foil 52AZ is further cut along a broken line 52L shown in FIG. 9B. Thereby, as shown in FIG. 9C, four anodes 52 with a predetermined shape are completed.

When the active material layer 51B and the active material layer 52B are formed, the capacity of inserting lithium per weight of the anode mixture and the capacity of extracting lithium per weight of the cathode mixture are measured in advance, and the capacity of inserting lithium per unit area of the active material layer 52B is set so as not to exceed the capacity of extracting lithium per unit area of the anode material layer 51B.

After the cathodes 51 and the anodes 52 are formed, the separators 54 which are cut into a rectangular shape so as to have a larger area than the coated regions 51D and 52D in the cathode 51 and the anode 52 are prepared. After that, three cathodes 51, four anodes 52 and six separators 54 are used to form a laminate type battery element 50 in which the anode 52, the separator 54, the cathode 51, the separator 54, the anode 52, the separator 54, the cathode 51, the separator 54, the anode 52, the separator 54, the cathode 51, the separator 54 and the anode 52 in order as shown in FIG. 6. At this time, the relative positions of the cathodes 51 and the anode 52 are adjusted so that when viewed from the laminate direction A, while the coated region 51D is fit into the inside of the coated region 52D, the exposed region 51C and the exposed region 52C do not coincide with each other. A precursor layer of the polymer electrolyte 53 may be formed in advance through applying the high molecular weight solution which is formed through dissolving a polymer in a solvent such as N-methyl-2-pyrrolidone to the separator 54 and drying the high molecular weight solution to remove the solvent,. Alternatively, the above-described high molecular weight solution may be applied to the cathode 51 or the anode 52 instead of the separator 54 in advance.

Thus, the laminate type battery element 50 using the active material layer 51B, the separator 54 and the active material layer 52B as a standard laminate unit is formed, and the active material layers 52B are disposed on both ends of the laminate type battery element 50 in the laminate direction A.

After the battery element 50 is formed, the exposed regions 51C of three cathodes 51 are adhered to the cathode terminal 41 at a time (refer to FIG. 4). Likewise, the exposed regions 52C of four anodes 52 are adhered to the anode terminal 42 at a time. They are adhered by, for example, ultrasonic welding.

After the cathode terminal 41 and the anode terminal 42 are adhered, the laminate type battery element 50 is impregnated with the electrolyte solution, and the laminate type battery element 50 is sandwiched between the package members 61, and then edge portions of the package members 61 are adhered by thermal fusion bonding or the like to seal the battery element 50. At this time, the adhesive film 62 is inserted between the cathode terminal 41 and the anode terminal 42 and the package members 61. After that, if necessary, heat is applied to make the polymer hold the electrolyte solution, thereby the polymer electrolyte 53 is formed. At this time, the adhesive strength of the polymer electrolyte 53 can be controlled by changing heat conditions as necessary or applying pressure. Thus, the secondary battery 2 shown in FIG. 4 is completed.

In the secondary battery 2, the exposed region 51C of the current collector 51A or the exposed region 52C of the current collector 52A and the separator 54 are firmly adhered to each other with the polymer electrolyte 53 in between, so even in the case where some external forces are applied, it is difficult to displace the relative positions of the cathode 51, the anode 52 and the separator 54. Moreover, the area of the separator 54 is larger than the areas of the coated regions 51D and 52D, and edge portions 54B are adhered to each other, so even under a high-temperature environment, the heat shrinkage of the separator 54 can be prevented. Therefore, in the secondary battery 2, the influence of external forces on the separator 54 or the influence of thermal load can be reduced, and heat generation due to the generation of a short-circuit current can be prevented.

EXAMPLES

Specific examples of the invention will be described in detail below.

Examples 1-1 to 1-3

The secondary batteries 1 shown in FIGS. 1 and 2 were formed.

At first, 0.5 mol of lithium carbonate and 1 mol of cobalt carbonate were mixed to form a mixture, and the mixture was fired in air at 900° C. for 5 hours to synthesize lithium-cobalt complex oxide ($LiCoO_2$) as a cathode active material. Next, 85 parts by weight of lithium-cobalt complex oxide powder, 5 parts by weight of graphite powder as an electrical conductor and 10 parts by weight of polyvinylidene fluoride as a binder were mixed to form a cathode mixture, and then the cathode mixture was dispersed in N-methyl-2-pyrrolidone as a solvent to form cathode mixture slurry.

Next, the cathode mixture slurry was uniformly applied to both sides of the current collector 21A made of aluminum foil with a thickness of 20 μm so that both end portions of the current collector 21A were exposed, and the cathode mixture slurry was dried, and compression molded by a roller press so as to form the active material layer 21B and the exposed region 21C, thereby a strip-shaped cathode 21 was formed. After that, the cathode terminal 11 was attached to the exposed region 21C.

Moreover, pulverized graphite powder was used as an anode active material, and 90 parts by weight of the graphite powder, 10 parts by weight of polyvinylidene fluoride as a binder were mixed to form an anode mixture, and then the anode mixture was dispersed in N-methyl-2-pyrrolidone as a solvent to form anode mixture slurry.

Next, the anode mixture slurry was uniformly applied to both sides of the current collector 22A made of copper foil with a thickness of 15 μm so that both end portions of the current collector 22A were exposed, and the anode mixture slurry was dried, and compression molded so as to form the active material layer 22B and the exposed region 22C, thereby a strip-shaped anode 22 was formed. After that, the anode terminal 12 was attached to the exposed region 22C.

Next, polyvinylidene fluoride was prepared as a polymer, and polyvinylidene fluoride was dissolved in N-methyl-2-pyrrolidone as a solvent to form a high molecular weight solution. The content of polyvinylidene fluoride in the high molecular weight solution was 15 wt %. Next, after the high molecular weight solution was applied to the separator 24 made of a microporous polyethylene film with a thickness of 20 μm through the use of a coating apparatus, the separator 24 coated with the high molecular weight solution was impregnated with deionized water, and then the separator 24 was dried. Thereby, a precursor layer of the polymer electrolyte 23 was formed. The high molecular weight solution was entirely applied to only one side of the separator 24 in Examples 1-1 and 1-2, and the high molecular weight solution was entirely applied to both sides of the separator 24 in Example 1-3.

After that, the formed cathode 21 and the formed anode 22 were adhered to each other with the separator 24 on which the precursor layer was formed in between, and they were spirally wound in a longitudinal direction so as to form a spirally wound electrode body. At that time, in Example 1-1, the precursor layer and the anode 22 were adhered so as to face each other, and in Example 1-2, the precursor layer and the cathode 21 were adhered so as to face each other, and in Example 1-3, the precursor layer was adhered to the cathode 21 and the anode 22 so as to face the cathode 21 and the anode 22. Next, the spirally wound electrode body was sandwiched between the package members 30 made of a moisture-proof aluminum laminate film, and then the edge portions of the package members 30 except for one side were adhered by thermal fusion bonding, and the electrolyte solution was injected into the package members 30. As the aluminum laminate film, a laminate film in which a nylon film with a thickness of 25 μm, aluminum foil with a thickness of 40 μm and a polypropylene film with a thickness of 30 μm were bonded together was used, and the polypropylene film of the aluminum laminate film faced the spirally wound electrode body. As the electrolyte solution, an electrolyte solution formed through dissolving 1 mol/l of $LiPF_6$ as an electrolyte salt in a mixed solvent formed through mixing ethylene carbonate and diethyl carbonate at a weight ratio of 3:7 was used. After that, the edge portions of the package members 30 on the remaining side were bonded, and the package members 30 were sandwiched between iron plates, and heated at 70° C. for 3 minutes, thereby the polymer held the electrolyte solution so as to form the polymer electrolyte 23, and the exposed region 22C or/and the exposed region 21C and the separator 24 were adhered to each other with the polymer electrolyte 23 in between so as to form the secondary battery 1 shown in FIGS. 1 and 2. The thickness of the polymer electrolyte 23 was 5 μm.

As Comparative Example 1-1 relative to Examples 1-1 through 1-3, a secondary battery was formed as in the case of Examples 1-1 through 1-3, except that the precursor layer was not formed on the separator 24.

The following heat test was performed on the secondary batteries of Examples 1-1 through 1-3 and Comparative Example 1-1. At first, the secondary batteries were charged at a constant current of 500 mA and a constant voltage at 23° C. until reaching an upper limit voltage of 4.2 V for 2 hours, and then the secondary batteries were discharged at a constant current of 500 mA until reaching an end voltage of 2.5 V. Next, the secondary batteries were charged at a constant current of 500 mA and a constant voltage at 23° C. until reaching an upper limit voltage of 4.2 V, and then the secondary batteries were put in a constant temperature bath of 23° C., and the temperature rose at a rate of 5° C. per minute until reaching 150° C. or 155° C., then the temperature was kept for one hour. At that time, whether the package members 30 were broken or not due to the generation of a gas was checked. The results are shown in Table 1.

Figure 3:
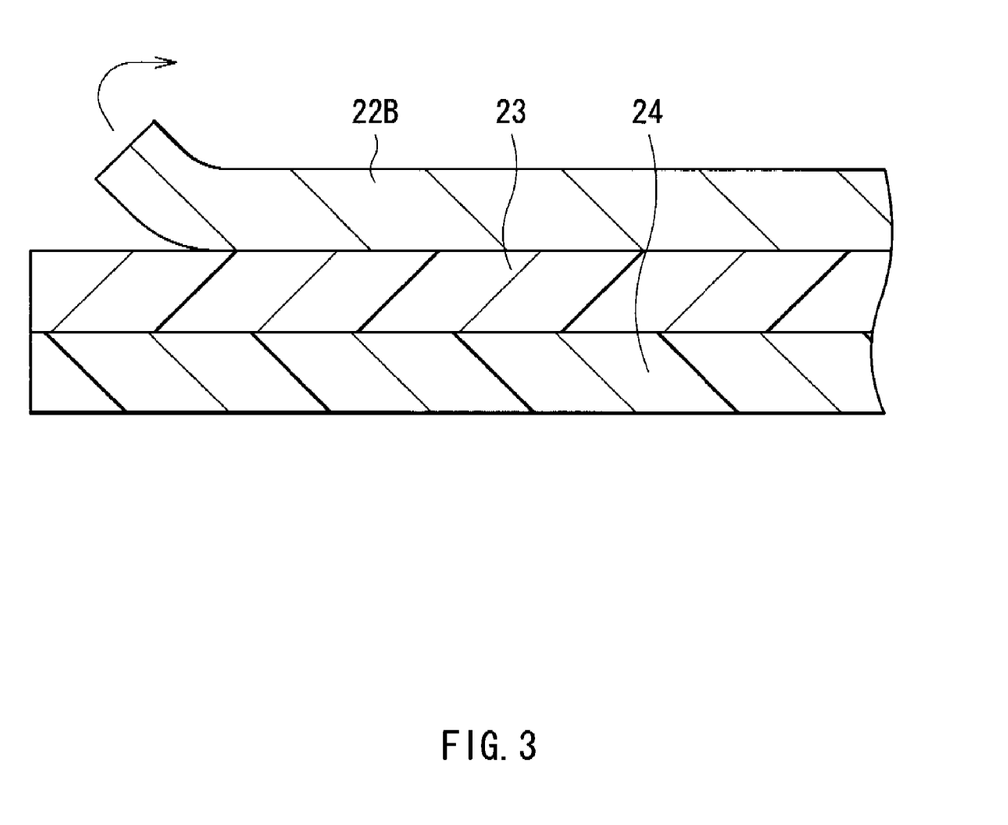
FIG. 3 is an illustration for describing a method of measuring peel strength in examples.

Moreover, the secondary batteries of Examples 1-1 through 1-3 and Comparative Example 1-1 were charged and then discharged at a constant current and a constant voltage under the same conditions as those described above. The secondary batteries were disassembled, and the exposed regions 21C and 22C and the separator 24 were peeled from each other in the following manner to measure the peel strength. At first, a portion where the exposed region 22C (or the exposed region 21C) and the separator 24 faced each other was cut into a piece with a width of 25 mm and a length of 50 nm as a sample. The obtained sample was placed on a support table so that the current collector 22A (or the current collector 21A) was positioned on the top, and as shown in FIG. 3, the current collector 22A (or the current collector 21A) was pulled to a 180° direction so as to peel the current collector 22A (or the current collector 21A) from the separator 24. The speed of pulling the current collector 22A (or the current collector 21A) was 10 cm/minute. The peel strength was an average of forces necessary to peel the current collector 22A (or the current collector 21A) from 6 seconds to 25 seconds after starting pulling the current collector 22A (or the current collector 21A). The results are shown in Table 1.

TABLE 1

| | HEATING TEMPERATURE (° C.) | PEEL STRENGTH (mN/mm) | | BREAKAGE OF PACKAGE MEMBERS 30 | |
|---|---|---|---|---|---|
| | | EXPOSED REGION 22C-SEPARATOR 24 | EXPOSED REGION 21C-SEPARATOR 24 | 150° C. | 155° C. |
| EXAMPLE 1-1 | 70 | 15.8 | — | NO | NO |
| EXAMPLE 1-2 | 70 | — | 16.4 | NO | NO |
| EXAMPLE 1-3 | 70 | 16.3 | 15.5 | NO | NO |
| COMPARATIVE EXAMPLE 1-1 | 70 | — | — | YES | YES |

It was obvious from Table 1 that in Examples 1-1 through 1-3 in which the exposed region 21C or the exposed region 22C and the separator 24 were adhered together by the polymer electrolyte 23, the breakage of the package members 30 at a high temperature was not observed; however, in Comparative Example 1-1 in which they were not adhered by the polymer electrolyte, the breakage of the package members 30 at a high temperature was observed.

In other words, it was found out that when at least one of the exposed region 21C of the current collector 21A and the exposed region 22C of the current collector 22A and the separator 24 were adhered to each other with the polymer electrolyte 23 including the polymer in between, even under a high-temperature environment, heat generation can be prevented.

Examples 2-1 through 2-3

Secondary batteries were formed as in the case of Example 1-1, except that the heating temperature when the exposed region 22C and the separator 24 were adhered to each other with the polymer electrolyte 23 in between was changed. The heating temperature was 75° C. in Example 2-1, 65° C. in Example 2-2 and 60° C. in the Example 2-3.

A heat test was performed on the secondary batteries of Examples 2-1 through 2-3 as in the case of Examples 1-1 through 1-3, and the peel strengths of Examples 2-1 through 2-3 when the exposed region 22C and the separator 24 were peeled from each other were measured. The results are shown in Table 2 together with the results of Example 1-1 and Comparative Example 1-1.

It was obvious from Table 2 that in Examples 1-1, 2-1 and 2-2 in which the peel strength was 5 mN/mm or over, the breakage of the package members 30 was not observed in the heat test at 150° C. and 155° C.; however, in Example 2-3 in which the peel strength was less than 5 mN/mm, the breakage of the package members 30 was observed in the heat test at 155° C.

In other words, it was found out that the peel strength when at least one of the exposed region 21C and the exposed region 22C and the separator 24 were peeled was preferably 5 mN/mm or over.

Examples 3-1, 3-2

Secondary batteries were formed as in the case of Example 1-1, except that as the polymer, a copolymer formed through copolymerizing 91 parts by weight of vinylidene fluoride, 4 parts by weight of hexafluoropropylene and 5 parts by weight of chlorotrifluoroethylene was used, or polymethylmethacrylate was used.

A heat test was performed on the secondary batteries of Examples 3-1 and 3-2 as in the case of Examples 1-1 through 1-3, and the peel strengths of Examples 3-1 and 3-2 were measured by peeling the exposed region 22C and the separator 24 from each other. The results are shown in Table 3 together with the results of Example 1-1 and Comparative Example 1-1.

TABLE 2

| | HEATING TEMPERATURE (° C.) | PEEL STRENGTH BETWEEN EXPOSED REGION 22C-SEPARATOR 24 (mN/mm) | BREAKAGE OF PACKAGE MEMBERS 30 | |
|---|---|---|---|---|
| | | | 150° C. | 155° C. |
| EXAMPLE 1-1 | 75 | 18.7 | NO | NO |
| EXAMPLE 2-1 | 70 | 15.8 | NO | NO |
| EXAMPLE 2-2 | 65 | 5.1 | NO | NO |
| EXAMPLE 2-3 | 60 | 3.9 | NO | YES |
| COMPARATIVE EXAMPLE 1-1 | 70 | — | YES | YES |

TABLE 3

| | HIGH MOLECULAR WEIGHT COMPOUND | PEEL STRENGTH BETWEEN EXPOSED REGION 22C- SEPARATOR 24 (mN/mm) | BREAKAGE OF PACKAGE MEMBERS 30 | |
|---|---|---|---|---|
| | | | 150° C. | 155° C. |
| EXAMPLE 1-1 | POLYVINYLIDENE FLUORIDE | 15.8 | NO | NO |
| EXAMPLE 3-1 | COPOLYMER OF VINYLIDENE FLUORIDE | 17.3 | NO | NO |
| EXAMPLE 3-2 | POLYMETHYLMETHACRYLATE | 6.9 | NO | YES |
| COMPARATIVE EXAMPLE 1-1 | — | — | YES | YES |

It was obvious from Table 3 that as in the case of Example 1-1, in Example 3-1 and 3-2 in which the copolymer of vinylidene fluoride or polymethylmethacrylate was used, the breakage of the package members 30 was not observed at 150° C. On the other hand, in the heat test at 155° C., in Example 3-1 in which the copolymer of vinylidene fluoride was used, the breakage of the package members 30 was not observed; however, in Example 3-2 in which polymethylmethacrylate was used, the breakage of the package members 30 was observed.

In other words, it was found out that even if other polymers were used, when the exposed region 21C of the current collector 21A or the exposed region 22C of the current collector 22A and the separator 24 were adhered to each other with the polymer electrolyte 23 including the polymer in between, even in a high-temperature environment, heat generation can be prevented. Moreover, it was found out that a copolymer including vinylidene fluoride as a component was preferably used as the polymer.

Examples 4-1 to 4-3

Secondary batteries were formed as in the case of Example 1-1, except that the amount of the applied high molecular weight solution was adjusted to change the thickness of the polymer electrolyte 23. The thickness of the polymer electrolyte 23 was 10 μm, 1 μm or 0.5 μm.

A heat test was performed on the secondary batteries of Examples 4-1 through 4-3 as in the case of Examples 1-1 through 1-3, and the peel strengths of Examples 4-1 through 4-3 were measured by peeling the exposed region 22C and the separator 24 from each other. The results are shown in Table 4 together with the results of Example 1-1 and Comparative Example 1-1.

It was obvious from Table 4 that in Examples 1-1, 4-1 and 4-2 in which the thickness of the polymer electrolyte 23 was 1 μm or over, in the heat test at 150° C. and 155° C., the breakage of the package members 30 was not observed; however, in Example 4-3 in which the thickness of polymer electrolyte 23 was less than 1 μm, in the heat test at 155° C., the breakage of the package members 30 was observed.

In other words, it was found out that the thickness of the polymer electrolyte 23 was preferably 1 μm or over.

Examples 5-1 to 5-3

Next, the secondary batteries 2 shown in FIG. 5 were formed through the steps described in the second embodiment.

The same cathode mixture slurry and the same anode mixture slurry as those in Examples 1-1 through 1-3 were used. Moreover, as the current collector 51A, aluminum foil with a thickness of 20 μm was used, and as the current collector 52A, copper foil with a thickness of 15 μm was used.

As the high molecular weight solution applied to the separator 54, the same high molecular weight solution as that in Examples 1-1 through 1-3 was used. In this case, after the high molecular weigh solution was applied to the separator 54 made of a microporous polyethylene film with a thickness of 20 μm through the use of a coating apparatus, the separator 54 coated with the high molecular weight solution was impregnated with deionized water, and then the separator 54 was dried. Thereby, a precursor layer of the polymer electrolyte 53 was formed. At that time, in Example 5-1, the precursor layer was entirely formed only on a side facing the anode 52 of the separator 54, and in Example 5-2, the precursor layer was entirely formed only on a side facing the cathode 51 of the separator 54, and in Example 5-3, the precursor layer was formed on both of the side facing the cathode 51 and the side facing the anode 52.

TABLE 4

| | THICKNESS OF POLYMER ELECTROLY TE 23 (μm) | PEEL STRENGTH BETWEEN EXPOSED REGION 22C- SEPARATOR 24 (mN/mm) | BREAKAGE OF PACKAGE MEMBERS 30 | |
|---|---|---|---|---|
| | | | 150° C. | 155° C. |
| EXAMPLE 4-1 | 10 | 19.1 | NO | NO |
| EXAMPLE 1-1 | 5 | 15.8 | NO | NO |
| EXAMPLE 4-2 | 1 | 10.2 | NO | NO |
| EXAMPLE 4-3 | 0.5 | 5.3 | NO | YES |
| COMPARATIVE EXAMPLE 1-1 | — | — | YES | YES |

The same electrolyte solution as that in Examples 1-1 through 1-3 was used. The battery element 50 was impregnated with the electrolyte solution, and sandwiched between the package members 61 made of a moisture-proof aluminum laminate film, and then the battery element was sealed through thermally fusion bonding an opened portion under a reduced pressure. At that time, the cathode terminal and the anode terminal were drawn to outside via a thermally fusion bonded portion. As the aluminum laminate film as the package member 61, a laminate film formed through laminating and bonding a nylon film with a thickness of 25 μm, aluminum foil with a thickness of 40 μm and a polypropylene film with a thickness of 30 μm in this order was used, and the polypropylene film of the aluminum laminate film faced the battery element 50. After that, the package members 61 were sandwiched between iron plates, and heated at 70° C. for 3 minutes, thereby the polymer held the electrolyte solution so as to form the polymer electrolyte 23, and the exposed region 52C and the separator 54 (Example 5-1), the exposed region 51C and the separator 54 (Example 5-2), or the exposed region 51C, the exposed region 52C and the separator 54 (Example 5-3) were adhered to each other with the polymer electrolyte 53 in between so as to form the secondary battery 2 shown in FIG. 4. The thickness of the polymer electrolyte 53 was 5 μm.

As Comparative Example 5-1 relative to Examples 5-1 through 5-3, the secondary battery 2 was formed as in the case of Examples 5-1 through 5-3, except that the precursor layer was not formed on the separator 54.

A heat test was performed on the secondary batteries 2 of Examples 5-1 through 5-3 as in the case of Examples 1-1 through 1-3, and the peel strengths of Examples 5-1 through 5-3 were measured by peeling the exposed region 51C and the separator 54 or the exposed region 52C and the separator 54 from each other. The results are shown in Table 5.

polymer electrolyte 53, even under a high-temperature environment, the heat shrinkage of the separator 54 could be prevented, and as a result, the heat generation due to a short circuit between the cathode and the anode can be prevented.

Although the present invention is described referring to the embodiments and the examples, the invention is not limited to the embodiments and the examples, and can be variously modified. For example, in the above embodiments and the examples, the battery using lithium as an electrode reactant is described; however, the invention can be applied to the case where any other alkali metal such as sodium (Na) or potassium (K), alkali earth metal such as magnesium or calcium (Ca) or other light metal such as aluminum is used.

Moreover, in the embodiments and the examples, the case where the electrolyte solution is used as the electrolyte and the case where the gel electrolyte in which the polymer holds the electrolyte solution is used as the electrolyte are described; however, a mixture of the electrolyte solution or the gel electrolyte and any other electrolyte may be used. Examples of the other electrolyte include an organic solid electrolyte formed through dissolving or dispersing an electrolyte salt in a polymer having ionic conductivity, and an inorganic solid electrolyte including an ion conductive inorganic compound such as ion conductive ceramic, ion conductive glass or ionic crystal.

Further, in the embodiments and the examples, the case where the cathode 21 and the anode 22 are spirally wound and the case where a plurality of cathodes 51 and a plurality of anodes 52 are laminated are described; however, the cathode and the anode may be folded. The invention is applicable to not only secondary batteries but also any other batteries such as primary batteries in a like manner.

It should be understood by those skilled in the art that various modifications, combinations, sub-combinations and alterations may occur depending on design requirements and

TABLE 5

| | HEATING TEMPERATURE (° C.) | PEEL STRENGTH (mN/mm) | | BREAKAGE OF PACKAGE MEMBERS 61 | |
| --- | --- | --- | --- | --- | --- |
| | | EXPOSED REGION 52C- SEPARATOR 54 | EXPOSED REGION 51C- SEPARATOR 54 | 150° C. | 155° C. |
| EXAMPLE 5-1 | 70 | 15.4 | — | NO | NO |
| EXAMPLE 5-2 | 70 | — | 16.1 | NO | NO |
| EXAMPLE 5-3 | 70 | 15.7 | 15.8 | NO | NO |
| COMPARATIVE EXAMPLE 5-1 | 70 | — | — | YES | YES |

It was obvious from Table 5 that in Examples 5-1 through 5-3 in which the exposed region 51C or the exposed region 52C and the separator 54 were adhered by the polymer electrolyte 53, the breakage of the package members 61 was not observed at a high temperature; however, in Comparative Example 5-1 in which they were not adhered by the polymer electrolyte 53, the breakage of the package members 61 was observed at a high temperature. It was considered that the breakage of the package members 61 was caused by generating heat due to the short circuit between the cathode 51 and the anode 52 accompanied with the heat shrinkage of the separator 54, thereby generating a gas in the battery.

It was found out from the results that when at least one of the exposed region 51C and the exposed region 52C, and the separators 54 were adhered by the polymer electrolyte 53, and the edge portions 54B of the separator 54 were adhered by the other factors insofar as they are within the scope of the appended claims or the equivalents thereof.

What is claimed is:

1. A battery comprising:
   a film-shaped package member;
   a cathode in the film-shaped package member, the cathode including a cathode current collector and a cathode active material layer on at least part of the cathode current collector;
   an anode in the film-shaped package member, the anode including an anode current collector and an anode active material layer on at least part of the anode current collector;
   an exposed region on each current collector where the active material layer is not disposed on the current collector;

a separator in between the cathode and the anode, and a polymer electrolyte in between the separator and each of the active material layers, wherein, the polymer electrolyte includes a polymer, the exposed region and the separator are at least partially adhered to each other by the polymer electrolyte, and the peel strength when the exposed region that is at least partially adhered to the separator are peeled from each other is 5 mN/mm or greater.

2. The battery according to claim 1, wherein the polymer electrolyte includes vinylidene fluoride as a component.

3. The battery according to claim 1, wherein the thickness of the polymer electrolyte is 1 µm or greater.

4. The battery according to claim 1, wherein the cathode and the anode are spirally wound with the separator so as to form a spirally wound body, and the exposed region that is at least partially adhered to the separator is located at the end portion of the current collector.

5. The battery according to claim 1, wherein the cathode and the anode are alternately laminated with the separator in between so as to form a laminate, and the exposed region that is at least partially adhered to the separator is connected to a lead, the lead guiding an electromotive force generated in the laminate to outside.

6. The battery according to claim 5, wherein the separator is larger than regions where an active material layer of the cathode and an active material layer of the anode are formed, and edge portions on the top and the bottom of the separator are at least partially adhered to each other with the polymer electrolyte in between.

* * * * *